(12) United States Patent
Shin

(10) Patent No.: US 12,087,500 B2
(45) Date of Patent: Sep. 10, 2024

(54) WIRELESS CHARGING COIL AND ELECTRONIC DEVICE INCLUDING THE SAME

(71) Applicant: Samsung Electronics Co., Ltd., Suwon-si (KR)

(72) Inventor: Seungshik Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/158,501

(22) Filed: Jan. 26, 2021

(65) Prior Publication Data

US 2021/0249188 A1 Aug. 12, 2021

(30) Foreign Application Priority Data

Feb. 7, 2020 (KR) .................. 10-2020-0014771

(51) Int. Cl.
| | |
|---|---|
| *H02J 7/00* | (2006.01) |
| *H01F 38/14* | (2006.01) |
| *H02J 7/02* | (2016.01) |
| *H02J 50/00* | (2016.01) |
| *H02J 50/10* | (2016.01) |

(52) U.S. Cl.
CPC ............. *H01F 38/14* (2013.01); *H02J 7/02* (2013.01); *H02J 50/005* (2020.01); *H02J 50/10* (2016.02)

(58) Field of Classification Search
USPC .............. 320/106, 107, 108, 109, 110, 112
See application file for complete search history.

(56) References Cited

U.S. PATENT DOCUMENTS

| | | | |
|---|---|---|---|
| 9,991,744 B2 * | 6/2018 | Lee | .......................... H04B 5/79 |
| 10,461,426 B2 * | 10/2019 | Leem | ....................... H01Q 7/00 |
| 10,923,273 B2 | 2/2021 | Mehas et al. | |
| 2014/0168019 A1 | 6/2014 | Hirobe et al. | |
| 2016/0181857 A1 | 6/2016 | Konanur et al. | |
| 2018/0048184 A1 | 2/2018 | Stout, II et al. | |

(Continued)

FOREIGN PATENT DOCUMENTS

| | | |
|---|---|---|
| JP | 5988146 B2 | 9/2016 |
| KR | 20140113206 A * | 9/2014 |

(Continued)

OTHER PUBLICATIONS

International Search Report and Written Opinion dated Apr. 29, 2021, issued in International Patent Application No. PCT/KR2021/001004.

*Primary Examiner* — Brian Ngo
(74) *Attorney, Agent, or Firm* — Jefferson IP Law, LLP

(57) ABSTRACT

A wireless charging coil and an electronic device is provided. The coil includes a plurality of inner patterns arranged adjacent to a center of the coil, having a first line width, and wound spirally, and a plurality of outer patterns arranged on an outer side of the plurality of inner patterns, having a second line width, and wound spirally, wherein the plurality of inner patterns are arranged at a first interval, wherein the plurality of outer patterns are arranged at a second interval, wherein a maximum gap that is larger than the first interval and the second interval is disposed between the plurality of inner patterns and the plurality of outer patterns, and wherein the maximum gap is arranged in a first direction from the center of the coil.

21 Claims, 12 Drawing Sheets

(56) References Cited

U.S. PATENT DOCUMENTS

| | | |
|---|---|---|
| 2018/0174738 A1 | 6/2018 | Yuasa |
| 2019/0109373 A1 | 4/2019 | Ahn et al. |
| 2019/0148065 A1 | 5/2019 | Naruse et al. |
| 2019/0304670 A1 | 10/2019 | Chiyo |
| 2020/0036213 A1 | 1/2020 | Jeon et al. |

FOREIGN PATENT DOCUMENTS

| | | | | |
|---|---|---|---|---|
| KR | 20180050279 A | * | 5/2018 | |
| KR | 10-2019-0040642 A | | 4/2019 | |
| KR | 20190058024 A | * | 5/2019 | |
| KR | 20190136447 | * | 12/2019 | |
| KR | 20190136447 A | * | 12/2019 | |
| WO | WO-2017034290 A1 | * | 3/2017 | ............ H01F 27/28 |
| WO | 2018/031767 A1 | | 2/2018 | |

* cited by examiner

WIRELESS CHARGING COIL AND ELECTRONIC DEVICE INCLUDING THE SAME

CROSS-REFERENCE TO RELATED APPLICATION(S)

This application is based on and claims priority under 35 U.S.C. § 119(a) of a Korean patent application number 10-2020-0014771, filed on Feb. 7, 2020, in the Korean Intellectual Property Office, the disclosure of which is incorporated by reference herein in its entirety.

BACKGROUND

1. Field

The disclosure relates to a wireless charging coil and an electronic device including the same.

2. Description of Related Art

Wireless charging or non-contact charging technology has recently been developed and applied to various electronic devices.

Wireless charging technology refers to a technology that makes it possible to charge the battery of an electronic device without having to connect the electronic device to a wired charger such that the battery of a smartphone or a wearable device, for example, can be charged simply by placing the same on a charging pad or a charging cradle.

The above information is presented as background information only to assist with an understanding of the disclosure. No determination has been made, and no assertion is made, as to whether any of the above might be applicable as prior art with regard to the disclosure.

SUMMARY

Wireless charging devices (for example, charging pads or charging cradles) are classified into a stand-type device on which an electronic device is cradled in an upright position and a pad-type device on which an electronic device is simply placed.

Electronic devices tend to include large-screen displays, and the size and length of electronic device have accordingly been increasing. If an electronic device having a size or length larger than that of the electronic device considered when designing a wireless charging device is cradled on a stand-type wireless charging device, misalignment may easily occur between the coil of the electronic device and the wireless charging device. If the misalignment occurs, the wireless charging function may fail, or the wireless charging efficiency may degrade.

Aspects of the disclosure are to address at least the above-mentioned problems and/or disadvantages and to provide at least the advantages described below. Accordingly, an aspect of the disclosure is to provide a coil and an electronic device including the same, wherein the wireless charging range is increased such that compatibility with wireless charging devices can be improved.

Another aspect of the disclosure is to provide a coil and an electronic device including the same, which can perform a function of receiving wireless charging and a function of transmitting the same.

Additional aspects will be set forth in part in the description which follows and, in part, will be apparent from the description, or may be learned by practice of the presented embodiments.

In accordance with an aspect of the disclosure, an electronic device is provided. The electronic device includes a battery, a charging circuit, and a coil electrically connected to the charging circuit. The coil may include: a plurality of inner patterns arranged adjacent to a center of the coil, having a first line width, and wound spirally, and a plurality of outer patterns arranged on an outer side of the plurality of inner patterns, having a second line width, and wound spirally. The plurality of inner patterns may be arranged at a first interval. The plurality of outer patterns may be arranged at a second interval. A maximum gap that is larger than the first interval and the second interval may be disposed between the plurality of inner patterns and the plurality of outer patterns. The maximum gap may be arranged in a first direction from the center of the coil.

In accordance with another aspect of the disclosure, an electronic device is provided. The electronic device includes a battery, a charging circuit, and a coil electrically connected to the charging circuit. The coil may include a plurality of inner patterns arranged close to a center of the coil, having a first line width, and wound spirally, and a plurality of outer patterns arranged on an outer side of the plurality of inner patterns, having a second line width or a third line width, and wound spirally. The plurality of inner patterns may be arranged at a first interval. The plurality of outer patterns may be arranged at a second interval. The second line width may be larger than the first line width. The third line width may be larger than the second line width.

In accordance with another aspect of the disclosure, a circuit board including a coil for performing wireless charging is provided. The circuit board includes a plurality of inner patterns arranged close to a center of the coil, having a first line width, and wound spirally, and a plurality of outer patterns arranged on an outer side of the plurality of inner patterns, having a second line width, and wound spirally. The plurality of inner patterns may be arranged at a first interval. The plurality of outer patterns may be arranged at a second interval. A maximum gap that is larger than the first interval and the second interval may be disposed between the plurality of inner patterns and the plurality of outer patterns. The maximum gap may be arranged in a first direction from the center of the coil.

A coil and an electronic device including the same according to various embodiments may have an increased wireless charging range such that compatibility with wireless charging devices can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and its advantages, of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
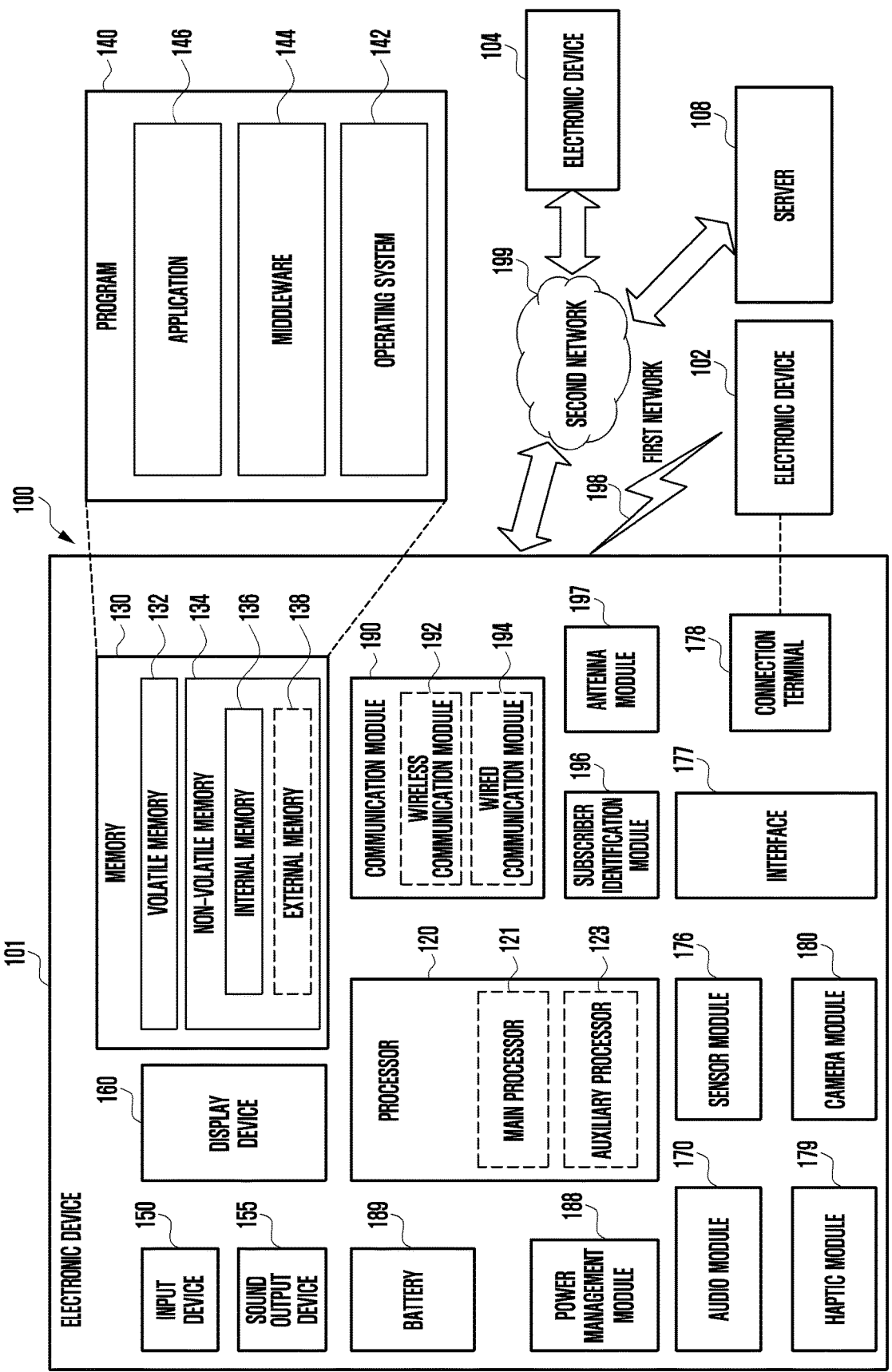
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
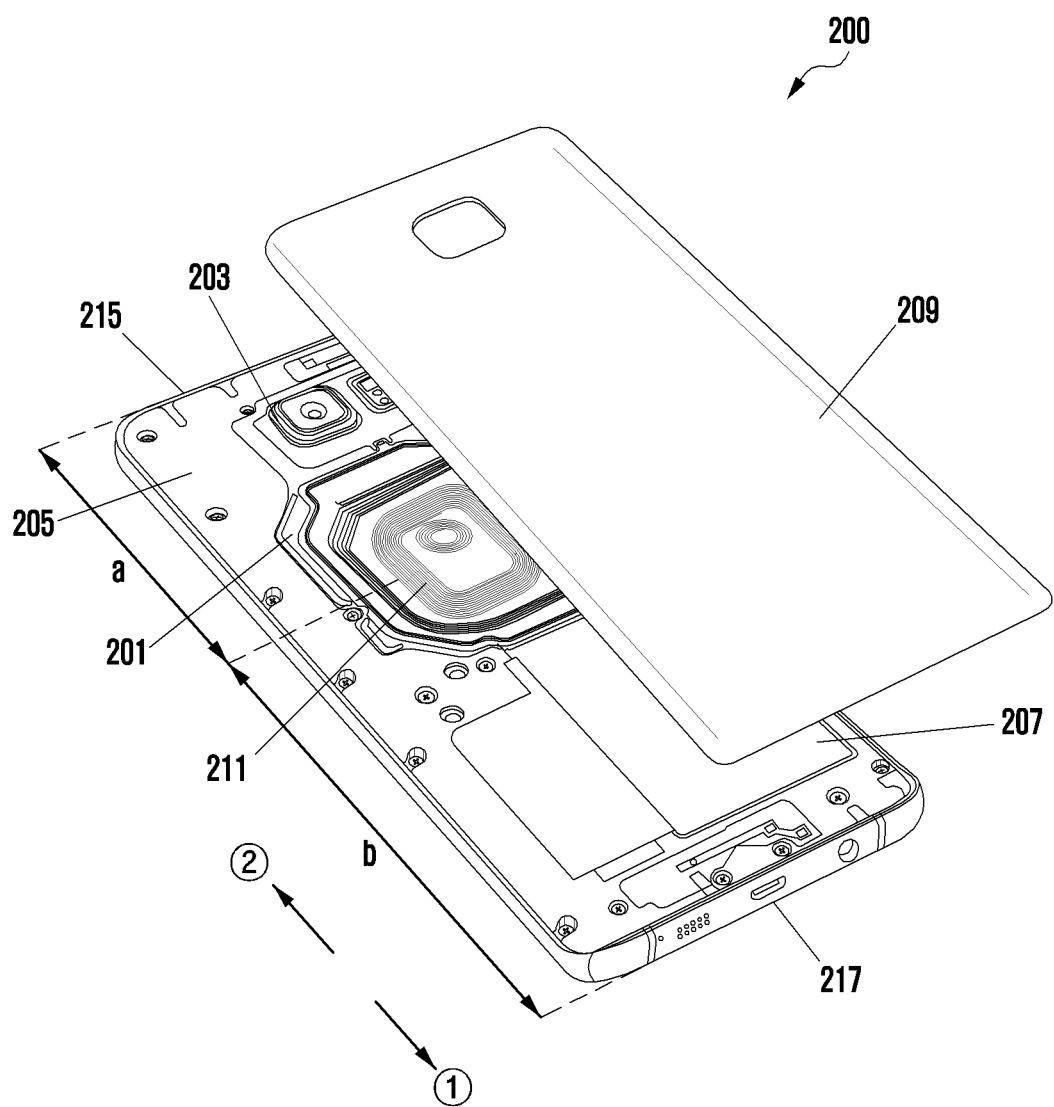
FIG. 2 is a perspective view illustrating a rear surface of an electronic device according to an embodiment of the disclosure.

FIG. 2 is a perspective view illustrating a rear surface of an electronic device according to an embodiment of the disclosure.

FIG. 2 illustrates a state, in which a cover located on a rear surface of an electronic device is detached.

Referring to FIG. 2, an electronic device 200 (e.g., the electronic device 101 of FIG. 1) may include a housing 205 that accommodates and fixes components. According to an embodiment, the housing 205 may include a first surface facing a front surface of the electronic device 200, on which a display (e.g., the display 160 of FIG. 1) (or a cover glass) of the electronic device 200 is located, a second surface facing a rear surface of the electronic device 200, which is opposite to the first surface, and a side member surrounding at least a portion of a space between the first and second surfaces. For example, the first surface may be a surface, on which the display 160 is located, and the second surface may be a surface, on which the cover 209 is located on the rear surface of the electronic device 200.

According to an embodiment, a flexible printed circuit board (FPCB) 201, in which one or more coils that form a loop antenna are arranged, a camera 203, or a battery 207 (e.g., the battery 189 of FIG. 1) may be located in the interior of the housing 205. FIG. 2 illustrates that the cover 209 is detached from the electronic device 200, but various embodiments are not limited by whether the cover 209 may be separated from the electronic device 200 by a general user.

According to an embodiment, the FPCB 201 may include a plurality of loop antennas 211. In an embodiment, the plurality of loop antennas 211 may include a first coil configured to form a loop antenna for performing a wireless charging function, a second coil configured to form a loop antenna (e.g., a magnetic secure transmission (MST) antenna) for performing a payment function, and a third coil configured to form a loop antenna for performing, for example, near field communication (NFC) communication as a dummy coil. For example, the first coil may be electrically connected to a charging circuit (e.g., the charging circuit 430 of FIG. 4) of the electronic device 200. The second coil may be electrically connected to an MST module (not illustrated) of the electronic device 200. The third coil may be electrically connected to an NFC module (not illustrated) of the electronic device 200.

According to an embodiment, the FPCB 201 may be located at a central portion of the electronic device 200, when viewed from the rear surface of the electronic device 200. According to another embodiment, the FPCB 201 may extend from the central portion of the electronic device 200 to an upper portion (e.g., a peripheral portion of the camera 203) when viewed from the rear surface of the electronic device 200, and the plurality of loop antennas 211 may be disposed at the extension portion. According to another embodiment, the FPCB 201 may extend from the central portion of the electronic device 200 to a lower side (e.g., a peripheral portion of the battery 207), and the plurality of loop antennas 211 may be disposed at the extension portion.

Figure 3:
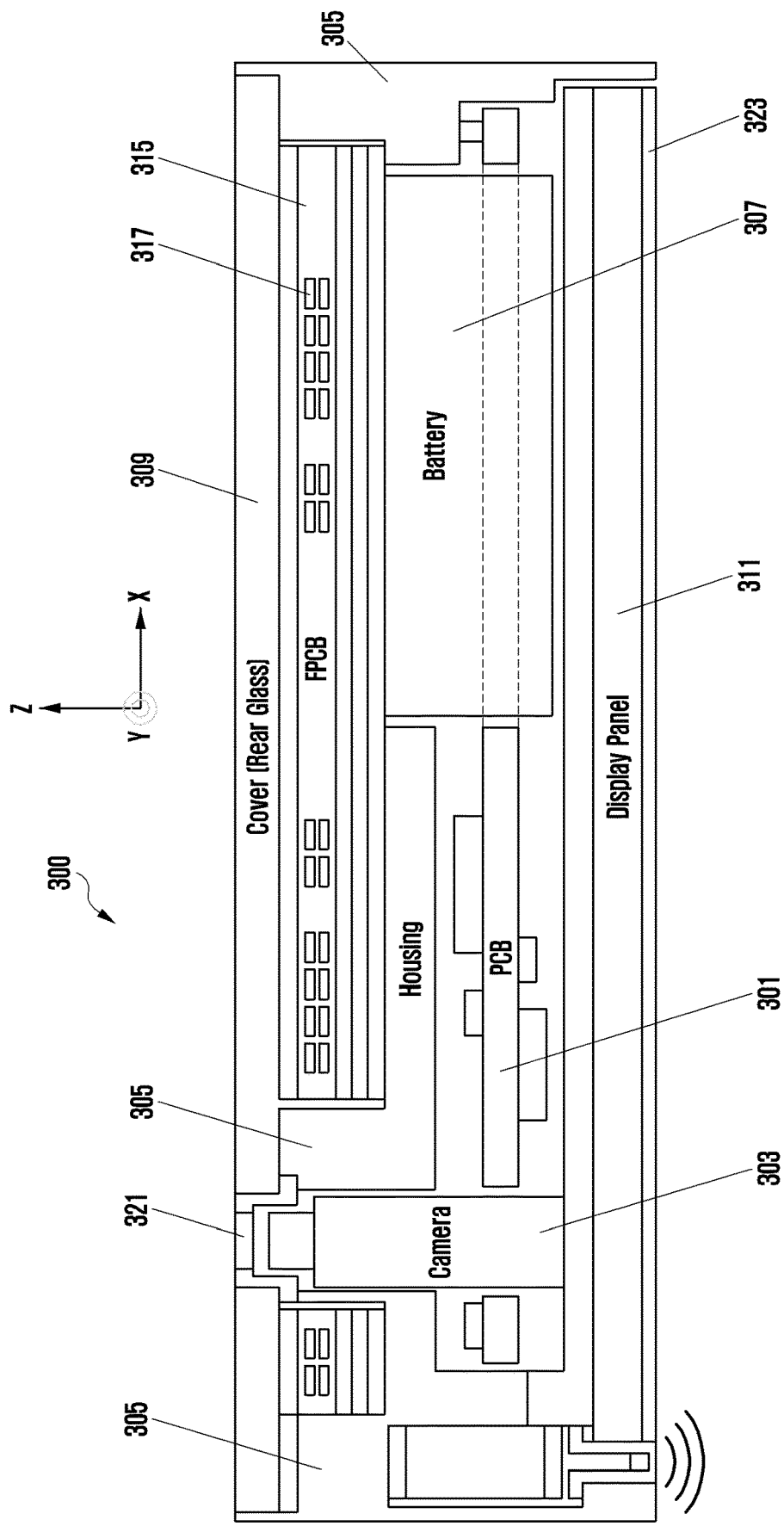
FIG. 3 is a schematic cross-sectional view of an electronic device according to an embodiment of the disclosure.

FIG. 3 is a schematic cross-sectional view of an electronic device according to an embodiment of the disclosure.

Referring to FIG. 3, the electronic device 300 (e.g., the electronic device 101 of FIG. 1) may include a housing 305 (e.g., the housing 205 of FIG. 2) that accommodates and fixes one or more components, or a cover 309 coupled to the housing 305 (e.g., the cover 209 of FIG. 2) on a rear surface of the electronic device 300. The components, for example, may include a display panel 311, a printed circuit board (PCB) 301, a battery 307 (e.g., the battery 189 of FIG. 1), a camera 303 (e.g., the camera 203 of FIG. 2), or an FPCB 315 (e.g., the FPCB 201 of FIG. 2), which are located in the interior of the housing 305.

The display panel 311, for example, may be attached to glass (e.g., the window cover) 323 located on the front surface of the electronic device 300. According to an embodiment, the display panel 311 may be integrally formed with a touch sensor or a pressure sensor. According to another embodiment, the touch sensor or the pressure sensor may be separated from the display panel 311. For example, the touch sensor may be located between the glass 323 and the display panel 311.

A communication module (e.g., the communication module 190 of FIG. 1) or a processor (e.g., the processor 120 of FIG. 1), for example, may be mounted on the circuit board 301. According to an embodiment, the circuit board 301 may be realized by using at least one of a printed circuit board (PCB) or a flexible printed circuit board (FPCB). According to an embodiment, the circuit board 301 may be electrically connected to the loop antenna 317 (e.g., the loop antenna 211 of FIG. 2) of the FPCB 315. According to an embodiment, the circuit board 301 is at least a portion of the communication circuit (e.g., the communication module 190 of FIG. 1), and the charging circuit (e.g., the charging circuit 430 of FIG. 4), the MST module, or the NFC module may be mounted on the circuit board 301.

The cover 309, for example, may be divided into a conductive area including a conductive material and a nonconductive area including a nonconductive material. For example, the cover 309 may be divided into a conductive area, and a nonconductive area located on one side or opposite sides of the conductive area. According to an embodiment, one or more openings 321 for exposing some parts of the electronic device 300 to the outside may be disposed in the cover 309. For example, the cover 309 may include one or more openings 321 for exposing a camera 303, a flash, or a sensor (e.g., the sensor module 176 of FIG. 1) (e.g., a fingerprint sensor).

According to an embodiment, the FPCB 315 may be attached to a lower surface (e.g., a surface facing the inside of the housing 305) of the cover 309. According to an embodiment, one or more loop antennas 317 may be mounted on the FPCB 315, and the FPCB 315 may be located to be electrically insulated from the conductive area of the cover 309.

According to various embodiments, some of the one or more loop antennas 317 may be configured to generate a magnetic field in a direction (the Z axis direction) that is perpendicular to the rear surface (the XY plane) of the electronic device 300.

Figure 4:
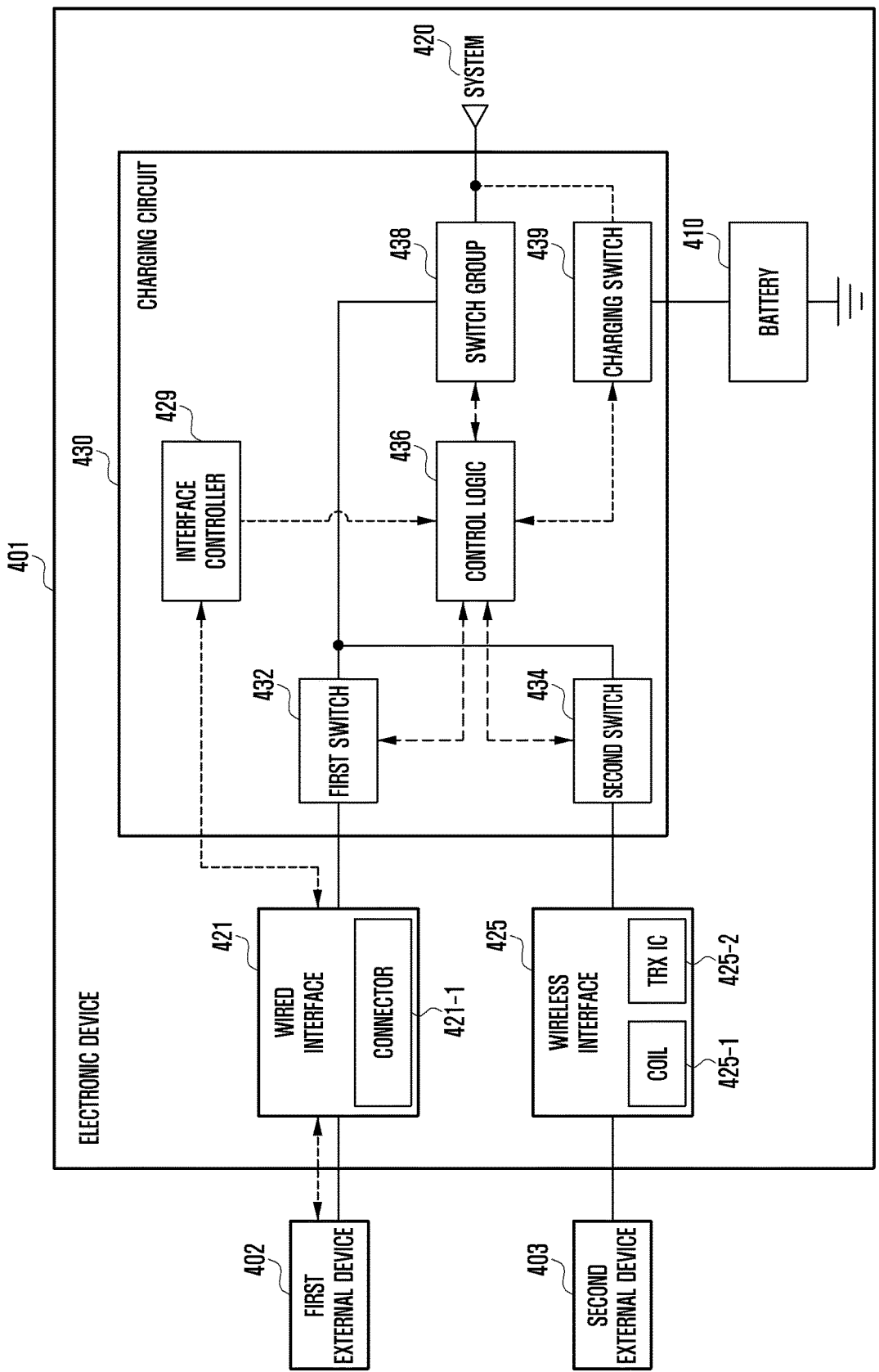
FIG. 4 is a conceptual view illustrating a concept of a charging circuit in an electronic device according to an embodiment of the disclosure.

FIG. 4 is a conceptual view illustrating a concept of a charging circuit in an electronic device according to an embodiment of the disclosure.

Referring to FIG. 4, the electronic device 401 (e.g., the electronic device 101 of FIG. 1) according to various embodiments may include a battery 410 (e.g., the battery 189 of FIG. 1), a wired interface 421, a wireless interface 425, and/or a charging circuit 430.

According to an embodiment, the battery 410 may be mounted in the housing (e.g., the housing 305 of FIG. 3) of the electronic device 401, and may be charged. The battery 410, for example, may include a lithium-ion battery, a rechargeable battery, and/or a solar battery.

According to an embodiment, the wired interface 421 and the wireless interface 425 may be mounted on portions of the housing of the electronic device 401, and may be connected to the external devices by wire, respectively. The wired interface 421, for example, may include a universal serial bus (USB) connector 421-1, may be connected to the first external device 402, and may be an interface for USB charging and/or on-the-go (OTG) power supply, or an external power source (a TA, a battery pack, or the like) may be connected to the wired interface 421. The wireless interface 425 may include a coil 425-1 (also referred to as 'a conductive pattern') (e.g., one or more loop antennas 417 of FIG. 4) and a transmission/reception integrated chip (TRX IC) 425-2, and may wirelessly transmit and receive electric power to and from the second external device 403 through the conductive pattern 425-1 and the TRX IC 425-2. In the wireless power transmission, electric power may be transmitted and received by using a wireless power transmission scheme, such as a magnetic field induction coupling scheme, a resonance coupling scheme, or a combination thereof. According to an embodiment, the conductive pattern 425-1 may include a first conductive pattern for wirelessly transmitting electric power, and a second conductive pattern for wirelessly receiving electric power.

According to an embodiment, the first external device 402 may be an external device that may be connected in a wired scheme, and may be a wired power supplying device or a wired power receiving device. The wired power receiving device may be an on-the-go (OTG) device. The OTG device may be a device, such as a mouse, a keyboard, a USB memory, and an accessory, which is connected to the electronic device 401 to receive electric power. The electronic device 401 may be operated in an OTG mode for supplying external electric power to the USB terminal. The wired charging device may be a device, such as a travel adapter (TA), which is connected to the electronic device 401 by wire to supply electric power to the electronic device 401. The wired power receiving device may be connected to the electronic device by wire to receive electric power from the electronic device 401 to be used as an internal power source, and may charge another battery provided in the wired power receiving device. According to an embodiment, the first external device connected to the electronic device 401 through the wired interface 421 may include a wired high-voltage (HV) device (e.g., a device that assists adaptive fast charge (AFC) or quick charge (QC). When the wired HV device is connected to the connector, electric power of a voltage (e.g., 9 V) that is higher than the voltage (e.g., 5 V) supplied from the battery 410 may be supplied to or received from the wired HV device.

According to an embodiment, the second external device 403 may include a wireless power supplying device or a wireless power receiving device. According to various embodiments, the wireless power supplying device may be a device, such as a wireless charging pad, which wirelessly supplies electric power to the electronic device 401 by using the first conductive pattern. The wireless power receiving device may be a device that may wirelessly receive electric power supplied from the electronic device 401, by using the second conductive pattern, and charges the received electric power in another battery included in the wireless power receiving device. According to an embodiment, the second external device 403 connected to the electronic device 401 through the wireless interface 425 may include a wired high-voltage (HV) device (e.g., a device that assists adaptive fast charge (AFC) or quick charge (QC)). According to an embodiment, the wireless HV device may include a wireless charging pad that assists quick charging. The wireless charging pad may determine whether quick charging will be performed, by communicating with the TRX IC 425-2 through in-band communication, or may determine whether quick charging will be performed, by using a separate communication module (Bluetooth or ZigBee). For example, the electronic device 401 may request, for example, charging of a high voltage of 9 V, from the wireless charging pad through the TRX IC 425-2, and may identify whether quick charging is possible, through communication with the electronic device 401 according to the request for HV charging by the electronic device 401. If it is identified that quick charging is possible, the wireless charging pad may supply electric power of 9 V to the electronic device 401.

According to an embodiment, the charging circuit 430 may be electrically connected to the battery 410, and may be configured to electrically connect the wired interface 421 and the wireless interface 425, the battery 410 and the wired interface 421, and the battery 410 and the wireless interface 425. The charging circuit 430 may be configured to electrically connect the battery 410 and the conductive pattern (e.g., the first conductive pattern) to wirelessly transmit electric power to the second external device 403 (e.g., the wireless power receiving device), and to electrically connect the battery 410 and the connector to transmit the electric power to the first external device 402 (e.g., the wired power receiving device) by a wire while wirelessly transmitting electric power to the outside. For example, the charging circuit 430 may change first power generated by the battery 410 to second power that is higher than the first power, and may transmit third power that is at least a portion of the second power to the wireless power receiving device through the first conductive pattern and may transmit fourth power that is at least a portion of the second power to the OTG device or the wired power receiving device through the connector.

According to an embodiment, the charging circuit 430 may include an interface controller 429, a first switch 432, a second switch 434, control logic 436, a switch group 438, and/or a charging switch 439.

According to an embodiment, the interface controller 429 may determine the kind of the first external device 402 connected to the wired interface 421, and may determine whether quick charging is assisted through adaptive fast charge (AFC) communication with the first external device 402. According to an embodiment, the interface controller 429 may include a micro USB interface IC (MUIC) or quick charging (e.g., adaptive fast charge (AFC) or quick charge (QC)) interface. For example, the MUIC may determine whether the first external device 402 connected to the wired interface 421 is a wired charging device or a wired power receiving device. For example, the quick charging interface may determine whether quick charging is assisted through communication with the first external device 402. When quick charging is assisted, the first external device 402 may increase transmitted/received electric power. For example, if quick charging is assisted when the first external device 402 is a wired charging that generally transmits electric power of 10 W (4 V/2 A), electric power of 15 W (9 V/1.6 A) (or about 18 W (e.g., 9 V/2 A) may be transmitted.

According to an embodiment, the first switch 432 may include one or more switches, and may control output of electric power to a device (e.g., the OTG device) connected through the wired interface 421 or the wired power receiving device, and input of electric power from the wired charging device. For example, the first switch 432 may be operated in an on state such that electric power is output to the OTG device or the wired power receiving device and electric power is input from the wired charging device, and may be operated in an off state such that electric power is not output to the OTG device or the wired power receiving device and electric power is not input from the wired charging device.

According to an embodiment, the second switch 434 may include one or more switches, and may control input and output of electric power to and from the wireless power supplying device and the wireless power receiving device through the wireless interface 425, for example, the conductive pattern 425-1 and the TRX IC 425-2. For example, the second switch 434 may be operated in an on state such that electric power may be input and output to and from the wireless power supplying device or the wireless power receiving device, or may be operated in an on state such that electric power may be neither input nor output to and from the wireless power supplying device or the wireless power receiving device.

According to an embodiment, the control logic 436 may perform a control such that the electric power input from at least one of the first switch 432 and the second switch 434 is converted to a charging voltage and a charging current that are suitable for charging of the battery 410, may perform a control such that the electric power from the battery 410 is converted to a charging voltage and a charging current that are suitable for charging of other batteries of the external devices connected to the first switch 432 and the second switch 434, respectively.

According to various embodiments, the control logic 436 may perform a control such that the charging circuit 430 transmits the power by the battery 410 to the outside selectively wirelessly or by wire. The control logic 436 may perform a control such that the electric power is transmitted to the first external device 402 and/or the second external device 403 through the charging circuit 430, or the electric power is received from the first external device 402 and/or the second external device 403.

According to various embodiments, the control logic 436 may perform a control such that the battery 410 is charged by using the electric power received from the wireless power supplying device when the wired charging device is connected. The control logic 436 may perform a control such that an OTG function is performed when the OTG device is connected. The control logic 436 may perform a control such that the battery 410 is charged by receiving the electric power from the wireless power supplying device when the wired power supplying device is connected. The control logic 436 may perform a control such that the battery 410 is charged by receiving the electric power from the wireless power supplying device and the OTG function is performed as well when the wired power supplying device is connected to the OTG device. The control logic 436 may perform a control such that electric power is supplied to the wireless power receiving device by using the electric power of the battery 410 when the wireless power receiving device is connected. The control logic 436 may perform a control such that the battery 410 is charged and the wireless power receiving device is supplied with electric power as well by receiving electric power from the wired charging device when the wired charging device and the wireless power receiving device are connected to each other. The control logic 436 may perform a control such that the OTG function is performed and electric power is supplied to the wireless power receiving device by using the electric power of the battery 410 as well when the OTG device and the wireless power receiving device are connected to each other.

According to an embodiment, the switch group 438 may provide a constant current to the system 420, for example, the system 420 that supplies electric power to the modules of the electronic device. According to an embodiment, the switch group 438 may boost (↑) or buck (↓) the voltage of the battery 410 to provide a constant current to the connected external device 402 and 403, or may boost (↑) or buck (↓) the charging voltage provided to provide a constant current to the battery 410. According to an embodiment, the switch group 438 may include a buck/boost converter.

According to an embodiment, the charging switch 439 may detect the amount of charging currents, and may stop charging of the battery 410 during overcharging or overheating.

According to an embodiment, the electronic device 401 may include a display (e.g., the display device 160 of FIG. 1). The display 160 may display a user interface configured to control at least a portion of the charging circuit 430. The display 160 may receive a user input that causes the electric power from the battery 410 to be transmitted to the external device 402 and 403 by wire or wirelessly, respectively. The display 160 may display one or more external devices 402 and 403 connected to the electronic device 401, may display the residual power level of the battery of the connected external device 402 and 403, or may display whether electric power is being supplied to the connected external device 402 and 403 or electric power is being received from the connected external device 402 and 403. When a plurality of external devices 402 and 403 are connected to the electronic device and electric power is provided to the plurality of external devices 402 and 403, a screen, through which distribution of electric power provided to the plurality of external devices 402 and 403 may be adjusted, may be displayed, and a screen, through which a power provision priority of the plurality of external devices 402 and 403 may be selected, may be displayed. The display 160 may display a screen that displays information on the display 160 of the connected external device 402 and 403. At least some of the contents displayed on the display 160 may be changed according to a signal received from the connected external device 402 and 403.

The electronic device (e.g., the electronic device 200 of FIG. 2) according to various embodiments may include a battery; a charging circuit; and a coil (e.g., 510 of FIG. 5A) electrically connected to the charging circuit, the coil 510 may include a plurality of inner patterns (e.g., 511 of FIG. 5A) arranged close to the center of the coil 510, having a first line width (e.g., w1 of FIG. 6), and wound spirally, and a plurality of outer patterns (e.g., 513 of FIG. 5A) arranged on the outer side of the plurality of inner patterns 511, having a second line width (e.g., w2 of FIG. 6), and wound spirally, the plurality of inner patterns 511 may be disposed to be spaced apart from each other by a first interval (e.g., d1 of FIG. 6), the plurality of outer patterns 513 may be disposed to be spaced apart from each other by a second interval (e.g., d2 of FIG. 6), a maximum gap (e.g., G_max of FIG. 6) that is larger than the first interval d1 and the second interval d2 may be disposed between the plurality of inner patterns 511 and the plurality of outer patterns 513, and the maximum gap G_max may be arranged in a first direction from the center of the coil 510. The plurality of inner patterns 511 may be wound to have a circular shape when the center of the coil 510 is viewed from the top, and the plurality of outer patterns 513 may be wound to have an elliptical shape when the center of the coil 510 is viewed from the top. The plurality of outer patterns 513 may be wound to have an elliptical shape, which is long in a direction that is parallel to the first direction. The second line width w2 may be larger than the first line width w1. The second interval d2 may be larger than the first interval d1. A distance between, among the plurality of outer patterns 513, the innermost outer pattern 513, which is closest to the center of the coil 510, and the center of the coil may have a maximum value at a portion, at which the maximum gap G_max is disposed. The electronic device may further include a housing disposed to be long in a direction that is parallel to the first direction and including a first side surface and a second side surface that is opposite to the first side surface, and a first distance between the center of the coil 510 and the first side surface is smaller than a second distance between the center of the coil 510 and the second side surface. The second side surface may be arranged in a first direction from the center of the coil 510.

Figure 5A:
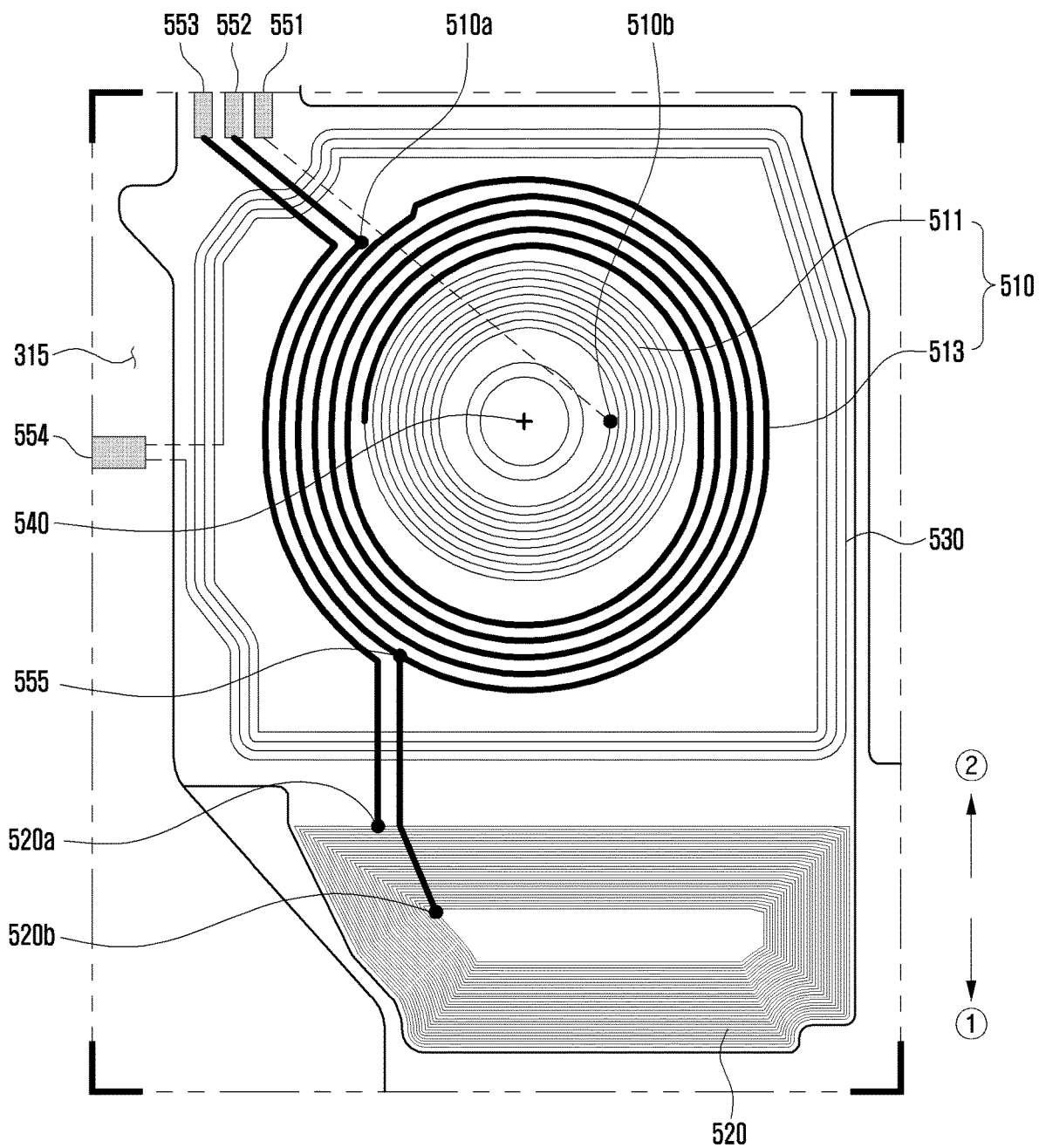
FIG. 5A is a plan view schematically illustrating a part of a flexible printed circuit boards (FPCB) illustrated in FIG. 3, in which a plurality of loop antennas are disposed according to an embodiment of the disclosure.

FIG. 5A is a plan view schematically illustrating a part of an FPCB illustrated in FIG. 3, in which a plurality of loop antennas are disposed according to an embodiment of the disclosure.

FIG. 5A may be a view illustrating portions, at which the plurality of loop antennas are disposed, in a layout form.

Figure 5B:
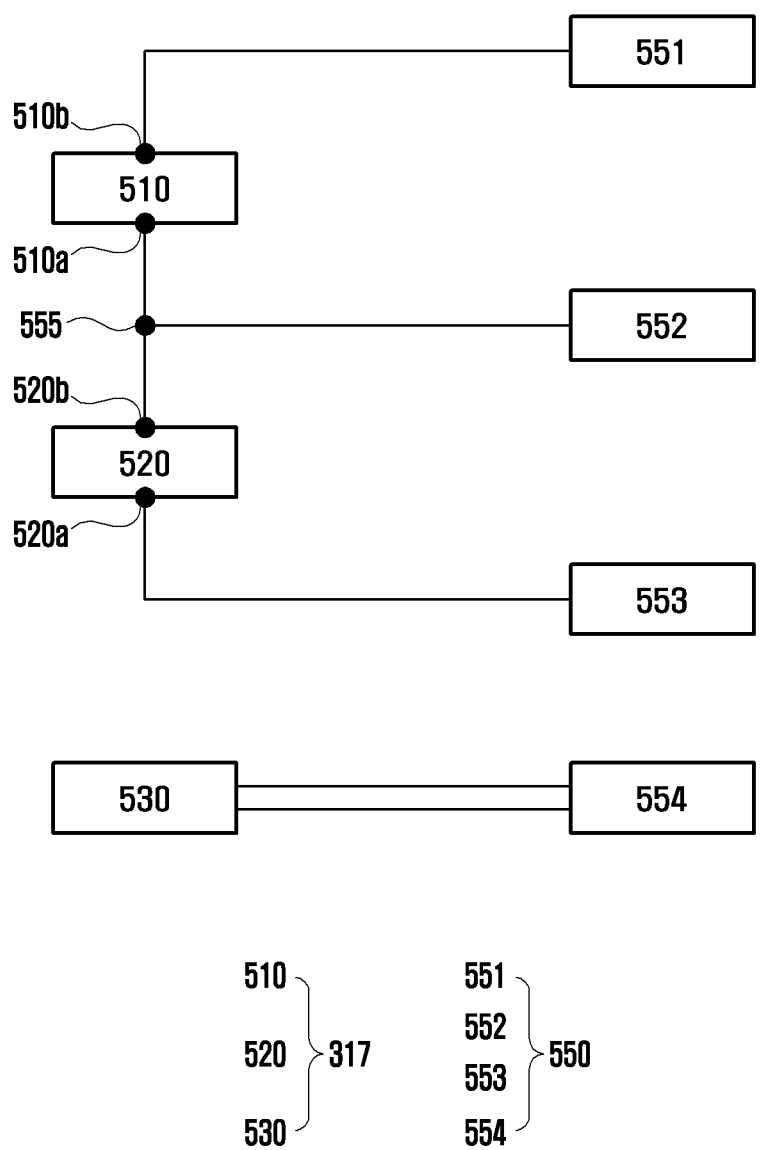
FIG. 5B is an equivalent circuit diagram of the plurality of loop antennas illustrated in FIG. 5A according to an embodiment of the disclosure.

FIG. 5B is an equivalent circuit diagram of the plurality of loop antennas illustrated in FIG. 5A according to an embodiment of the disclosure.

Referring to FIG. 5A, according to an embodiment, the FPCB 315 (e.g., the FPCB 201 of FIG. 2) may include a plurality of loop antennas 317 (e.g., the loop antenna 211 of FIG. 2). In an embodiment, the plurality of loop antennas 317 may include a first coil 510 configured to form a loop antenna for performing a wireless charging function, a second coil 520 configured to form a loop antenna (e.g., a magnetic secure transmission (MST) antenna) for performing a payment function, and a third coil 530 configured to form a loop antenna for performing, for example, near field communication (NFC) communication as a dummy coil. For example, the first coil 510 may be electrically connected to a charging circuit (e.g., the charging circuit 430 of FIG. 4) of the electronic device 200. The second coil 520 may be electrically connected to an MST module (not illustrated) of the electronic device 200. The third coil 530 may be electrically connected to an NFC module (not illustrated) of the electronic device 200.

According to an embodiment, the FPCB 315 may include a plurality of loop pads 550 electrically connected to the plurality of antennas 317. The plurality of pads 550 may be components that electrically connect the plurality of loop antennas 317 and the communication circuit (e.g., the charging circuit 430 of FIG. 4), the MST module, and the NFC module.

Referring to FIGS. 5A and 5B, the plurality of pads 550 may include first to fourth pads 551, 552, 553, and 554. According to an embodiment, the first coil 510 may be electrically connected to the first pad 551 and the second pad 552. The first coil 510 may be electrically connected to the charging circuit 430 through the first pad 551 and the second pad 552. The second coil 520 may be electrically connected to the second pad 552 and the third pad 553. The second coil 520 may be electrically connected to the MST module through the second pad 552 and the third pad 553. According to an embodiment, a first end 510a of the first coil 510 and a second end 520b of the second coil 520 may be electrically connected to each other via connection 555, and a second end 510b of the first coil 510 may be electrically connected to the first pad 551, and a first end 520a of the second coil 520 may be electrically connected to a third pad 553.

According to an embodiment, when the electronic device 200 performs a payment function through the MST module, both the first coil 510 and the second coil 520 may be used. For example, while the payment function is performed, an electrical path of "the first pad 551, the first coil 510, the second coil 520, and the third pad 553" may be formed, and the second pad 552 may be short-circuited.

According to an embodiment, the third coil 530 may be electrically connected to the fourth pad 554. The third coil 530 may be electrically connected to the NFC module through the fourth pad 554.

According to an embodiment, the electronic device (e.g., the electronic device 200 of FIG. 2) may wirelessly transmit and receive electric power by using the first coil 510, and may employ a magnetic field induction coupling method, a resonance coupling method, or a combination method thereof. According to an embodiment, the first coil 510 may include a first conductive pattern for wirelessly transmitting electric power, and a second conductive pattern for wirelessly receiving electric power. According to an embodiment, the plurality of inner patterns 531 that are close to the center 540 of the first coil 510 may be first conductive patterns for transmitting wireless power, and the plurality of outer patterns 533 arranged on the outer side of the plurality of inner patterns 533 may be second conductive patterns for receiving wireless power.

According to another embodiment, the first coil may be used to transmit wireless power or receive wireless power regardless of the plurality of inner patterns 531 and the plurality of outer patterns 533. For example, the plurality of inner patterns 531 may be used to transmit wireless power or receive wireless power. The plurality of inner patterns 531 may be used mainly to transmit wireless power to an external device of a relatively small size, for example, a wearable device. The plurality of outer patterns 533 may be used to transmit wireless power or receive wireless power. The plurality of outer patterns 533 may be used mainly to receive wireless power.

According to an embodiment, when a portion of the FPCB 315, in which the plurality of loop antennas 317 are disposed, is viewed from the top, the second coil 520 may be disposed in a first direction (①) (e.g., a lower side of the third coil) of the first coil 510.

According to an embodiment, when a portion of the FPCB 315, in which the plurality of loop antennas 317 are disposed, is viewed from the top, the third coil 530 may be disposed on the outer side of the first coil 510. For example, the third coil 530 may be disposed to surround the outer side of the first coil 510. According to another embodiment, the third coil 530 may be disposed to surround the outer side of the first coil 510 and the outer side of the second coil 520.

The first coil 510 according to various embodiments may include a structure, by which a recognition range for wireless charging, and can increase the compatibility with a wireless charging device (e.g., a charging pad or a charging cradle).

Hereinafter, a structure of the first coil 510 for widening the recognition range for wireless charging will be described in detail with reference to FIGS. 6 to 9.

Figure 6:
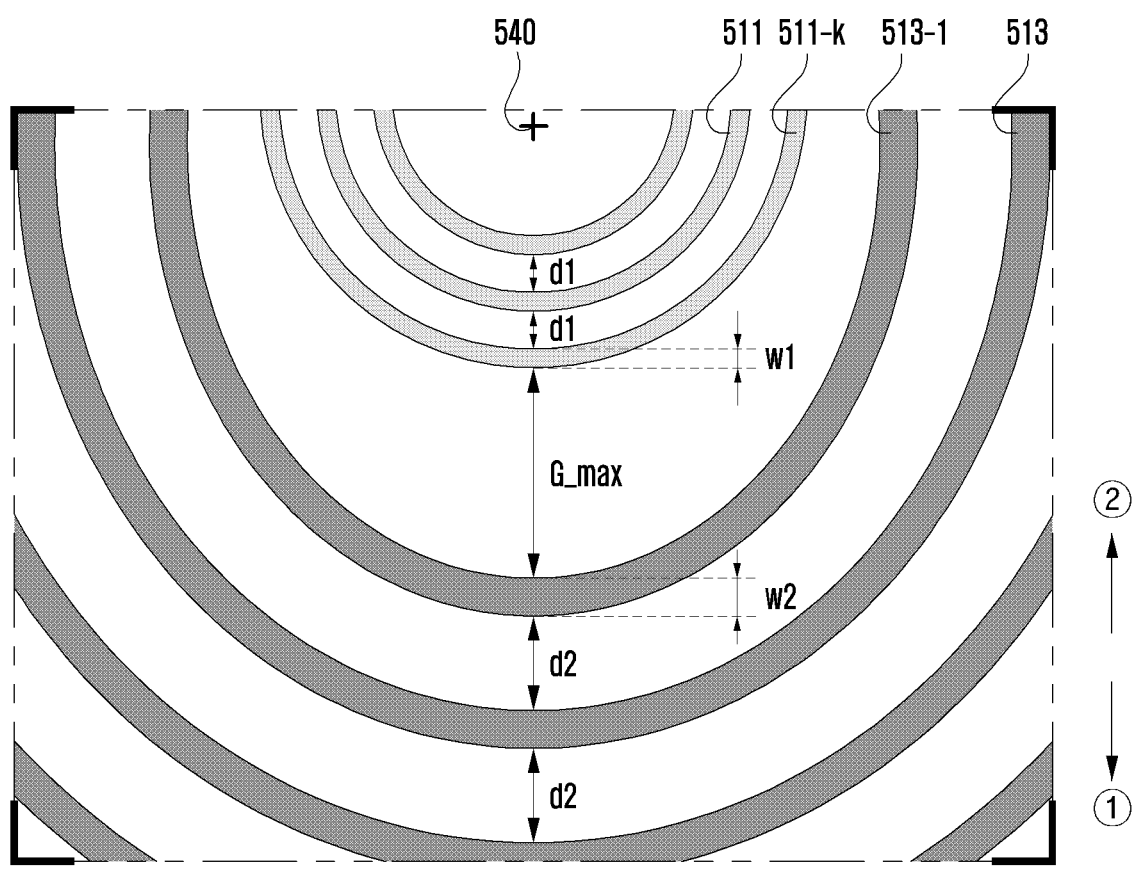
FIG. 6 is a view illustrating a third coil illustrated in FIGS. 5A and 5B in detail according to an embodiment of the disclosure.

FIG. 6 is a view illustrating a third coil illustrated in FIG. 5A in detail. FIG. 6 may be a view illustrating a border portion between the plurality of inner patterns and the plurality of outer patterns illustrated in FIG. 5A according to an embodiment of the disclosure.

Referring to FIG. 6, according to an embodiment, the first coil 510 may include a plurality of inner patterns 511 arranged close to the center 540 of the first coil 510, and a plurality of outer patterns 513 extending from the plurality of inner patterns 511 and arranged on the outer side of the plurality of inner patterns 511. For example, among the plurality of outer patterns 513, the outer patterns 513-1 located on the innermost side, for example, the first outer pattern 513-1 may extend from, among the plurality of inner patterns 511, the outermost inner pattern 511-$k$ located on the outermost side.

According to an embodiment, the plurality of inner patterns 511 may have a first line width w1, and may be wound spirally from a portion that is adjacent to the center 540 of the first coil 510. According to an embodiment, the plurality of inner patterns 511 may be wound to have a circular shape when viewed from the center 540 of the first coil 510. For example, according to an embodiment, the plurality of inner patterns 511 may be wound to have a first curvature.

According to an embodiment, the plurality of inner patterns 511 may be disposed to be spaced apart from each other by a first interval d1.

According to an embodiment, the plurality of outer patterns 513 may have a second line width w2 that is larger than the first line width w1, and may be wound spirally from the outermost inner pattern 511-$k$. According to an embodiment, the plurality of outer patterns 513 may be wound to have an elliptical shape when viewed from the center 540 of the first coil 510.

According to an embodiment, the plurality of outer patterns 513 may be disposed to be spaced apart from each other by a second interval d2, and the second interval d2 may be larger than the first interval d1. According to another embodiment, the second interval d2 may be the same as or different from the first interval d1. According to an embodiment, the plurality of outer patterns 513 may be wound to have a second curvature that is different from the first curvature, and the second curvature may vary according to the locations, at which the plurality of outer patterns 513 are wound.

According to an embodiment, a gap is disposed between the plurality of inner patterns 511 and the plurality of outer patterns 513, and a maximum gap G_max may be disposed in the first direction (①) from the center 540 of the first coil 510. According to an embodiment, the maximum gap G_max may be larger than the first interval d1 that is an interval between the plurality of inner patterns 511 and the second interval d2 that is an interval between the plurality of outer patterns 513. For example, the maximum gap G_max may be disposed between, among the plurality of inner patterns 511, the outermost inner pattern 511-$k$, and, among the plurality of outer patterns 513, the innermost pattern 513-1, and the maximum gap G_max may be disposed to be larger than the first interval d1 and the second interval d2.

According to an embodiment, the plurality of outer patterns 513 may be wound to have an elliptical shape, which is long in a direction that is parallel to the first direction (①). For example, a distance between, among the plurality of outer patterns 513, the innermost outer pattern 513, which is closest to the center 540 of the first coil 510, and the center 540 of the first coil 510 may have a maximum value at a portion, at which the maximum gap G_max is disposed.

In the first coil 510 according to an embodiment, the maximum gap G_max may be disposed in the first direction (①) from the center 540 of the first coil 510 to expand the recognition range for wireless charging from the center 540 of the first coil 510 in the first direction (①).

Because the first coil 510 according to an embodiment may include a structure in which the curvature of the plurality of inner patterns 511, for example, the first curvature is maintained and only the curvature of the plurality of outer patterns 513 having a relatively large line width, for example, the second curvature varies, a change in inductance can be minimized, and a resonance value set in advance for wireless charging can be maintained.

In the first coil 510 according to an embodiment, because the plurality of inner patterns 511 is disposed to have the first curvature and the plurality of outer patterns 513 having a relatively larger line width is disposed to have a second curvature, an inductance that is necessary for activation of a Tx function of transmitting wireless power and an Rx function of receiving wireless power by the electronic device 200 can be secured, and a resonance value set for wireless charging or discharging can be maintained.

Referring to FIGS. 2 and 6, a direction, in which the maximum gap G_max is disposed with respect to the center 540 of the first coil 510, for example, the first direction (①) may be a direction that is parallel to the lengthwise direction that defines the length of the electronic device.

According to an embodiment, the housing (e.g., the housing 205 of FIG. 2) may be disposed lengthwise in a direction that is parallel to the first direction (①) and the second direction (②).

According to an embodiment, the housing 205 may include a first side surface 215 that is adjacent to the upper portion (e.g., a peripheral portion of the camera 203) and a second side surface 217 that is opposite to the first side surface 215, and the first coil 510 may be arranged to be closer to the first side surface 215. For example, a first distance ("a" of FIG. 2) between the center 540 of the first coil 510 and the first side surface 215 may be smaller than a second distance ("b" of FIG. 2) between the center 540 of the first coil 510 and the second side surface 217.

According to another embodiment, the first coil 510 may be arranged to be closer to the second side surface 217, and in this case, the maximum gap G_max may be disposed in the second direction (②) from the center 540 of the first coil 510. If the maximum gap G_max is disposed in the second direction (②) from the center 540 of the first coil 510, the recognition range for wireless charging may be widened in the second direction (②) from the center 540 of the first coil 510.

According to another embodiment, the center 540 of the first coil 510 may be located in a central area of the electronic device 200, but this case may correspond to a case in which a distance between the center 540 of the first coil 510 and the second side surface 217 is large. The maximum gap G_max may be disposed in the first direction (①) from the center 540 of the first coil 510. If the maximum gap G_max is disposed in the first direction (①) from the center 540 of the first coil 510, the recognition range for wireless charging may be widened in the first direction (①) from the center 540 of the first coil 510.

The electronic device (e.g., the electronic device 200 of FIG. 2) according to various embodiments may include a battery; a charging circuit; and a coil (e.g., 510 of FIG. 7) electrically connected to the charging circuit, the coil 510 may include a plurality of inner patterns (e.g., 511 of FIG. 7) arranged close to the center of the coil 510, having a first line width (e.g., w1 of FIG. 8), and wound spirally, and a plurality of outer patterns (e.g., 513 of FIG. 7) arranged on the outer side of the plurality of inner patterns 511, having a second line width (e.g., w2 of FIG. 8) or a third line width (e.g., w3 of FIG. 8), and wound spirally, the plurality of inner patterns 511 may be disposed to be spaced apart from each other by a first interval (e.g., d1 of FIG. 8), the plurality of outer patterns 513 may be disposed to be spaced apart from each other by a second interval (e.g., d2 of FIG. 8), the second line width w2 may be larger than the first line width w1, and the third line width w3 may be larger than the second line width w2. The plurality of outer patterns 513 may include first parts disposed in a first direction of a transverse axis that crosses the center of the coil 510 and having the third line width w3, and second parts disposed in a second direction of the transverse axis and having the second line width w2. The second direction may be opposite to the first direction. The plurality of inner patterns 511 may be wound to have a circular shape when the center of the coil 510 is viewed from the top, and the plurality of outer patterns 513 may be wound to have an elliptical shape when the center of the coil 510 is viewed from the top. The plurality of outer patterns 513 may be wound to have an elliptical shape, which is long in a direction that is parallel to the first direction. The electronic device may further include a housing disposed to be long in a direction that is parallel to the first direction and including a first side surface and a second side surface that is opposite to the first side surface, and a first distance between the center of the coil 510 and the first side surface is smaller than a second distance between the center of the coil 510 and the second side surface. The second side surface may be arranged in a first direction from the center of the coil 510.

Figure 7:
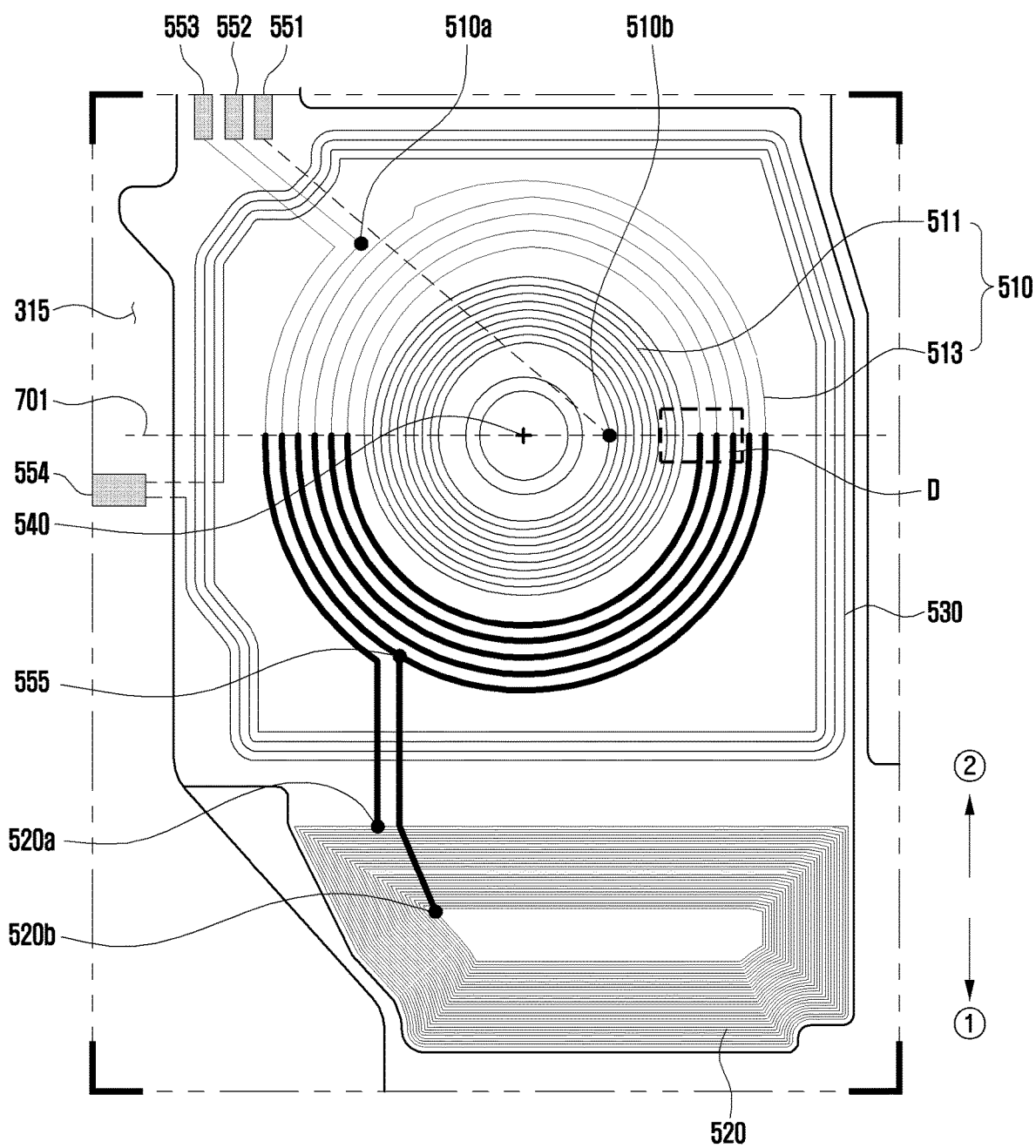
FIG. 7 is a plan view schematically illustrating a plurality of loop antennas according to an embodiment of the disclosure.

FIG. 7 is a plan view schematically illustrating a plurality of loop antennas according to an embodiment of the disclosure.

Figure 8:
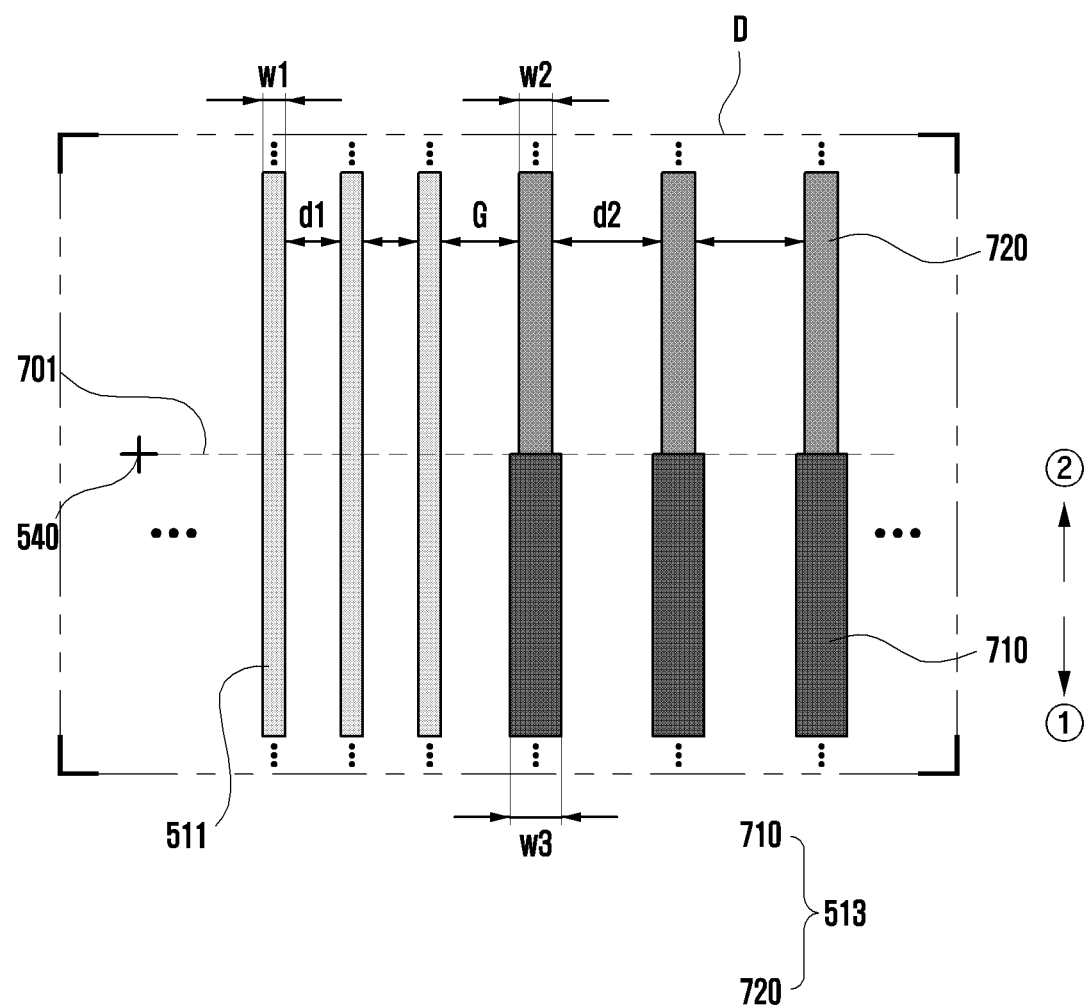
FIG. 8 is a view illustrating a first coil illustrated in FIG. 7 in detail according to an embodiment of the disclosure.

FIG. 8 is a view illustrating a first coil illustrated in FIG. 7 in detail. FIG. 8 may be a view illustrating a border portion of area "D" between the plurality of inner patterns and the plurality of outer patterns illustrated in FIG. 7 in detail according to an embodiment of the disclosure.

The first coil 510 illustrated in FIGS. 7 and 8 may be the same as or similar to the first coil 510 illustrated in FIGS. 5A and 6, except for the parts which will be described below.

According to another embodiment, unlike the first coil 510 illustrated in FIGS. 5A and 6, in the first coil 510 illustrated in FIGS. 7 and 8, the line width of the plurality of outer patterns 513 may vary.

The plurality of inner patterns 511 may have a first line width w1, and may be wound spirally from a portion that is adjacent to the center 540 of the first coil 510. According to another embodiment, the plurality of inner patterns 511 may be wound to have a circular shape when viewed from the center 540 of the first coil 510. For example, according to another embodiment, the plurality of inner patterns 511 may be wound to have a first curvature.

According to an embodiment, the plurality of inner patterns 511 may be disposed to be spaced apart from each other by a first interval d1.

According to an embodiment, the plurality of outer patterns 513 may have a second line width w2 or a third line width w3 that is larger than the first line width w1, and may be wound spirally from the outermost inner pattern 511. The plurality of outer patterns 513 may be wound to have an elliptical shape when viewed from the center 540 of the first coil 510.

According to an embodiment, the second line width w2 may be larger than the first line width w1, and the third line width w3 may be larger than the second line width w2.

According to an embodiment, the plurality of outer patterns 513 may be disposed to be spaced apart from each other by a second interval d2, and the second interval d2 may be larger than the first interval d1. For example, the plurality of outer patterns 513 may be wound to have a second curvature that is different from the first curvature, and the second curvature may vary according to the locations, at which the plurality of outer patterns 513 are wound.

According to an embodiment, a gap G may be disposed between the plurality of inner patterns 511 and the plurality of outer patterns 513, and the gap G may be constant. Further, the gap G may be disposed to have a size that is the same as or similar to the second interval d2.

According to an embodiment, the plurality of outer patterns 513 may be classified into first parts 710 and second parts 720 with respect to a transverse axis 701 that crosses the center 540 of the first coil 510. For example, the plurality of outer patterns 513 may include first parts 710 disposed in the first direction (①) of the transverse axis 701 that crosses the center 540 of the first coil 510 and having the third line width w3, and second parts 720 disposed in the second direction (②) of the transverse axis 701 and having the second line width w2. The second direction (②) may be opposite to the first direction (①).

The first coil 510 according to an embodiment may be disposed to have a third line width w3 that is a maximum line width in the first direction (①) with respect to the transverse axis 701 that crosses the center 540 of the first coil 510 to expand the recognition range for wireless charging to the first direction (①) from the center 540 of the first coil 510.

Figure 9:
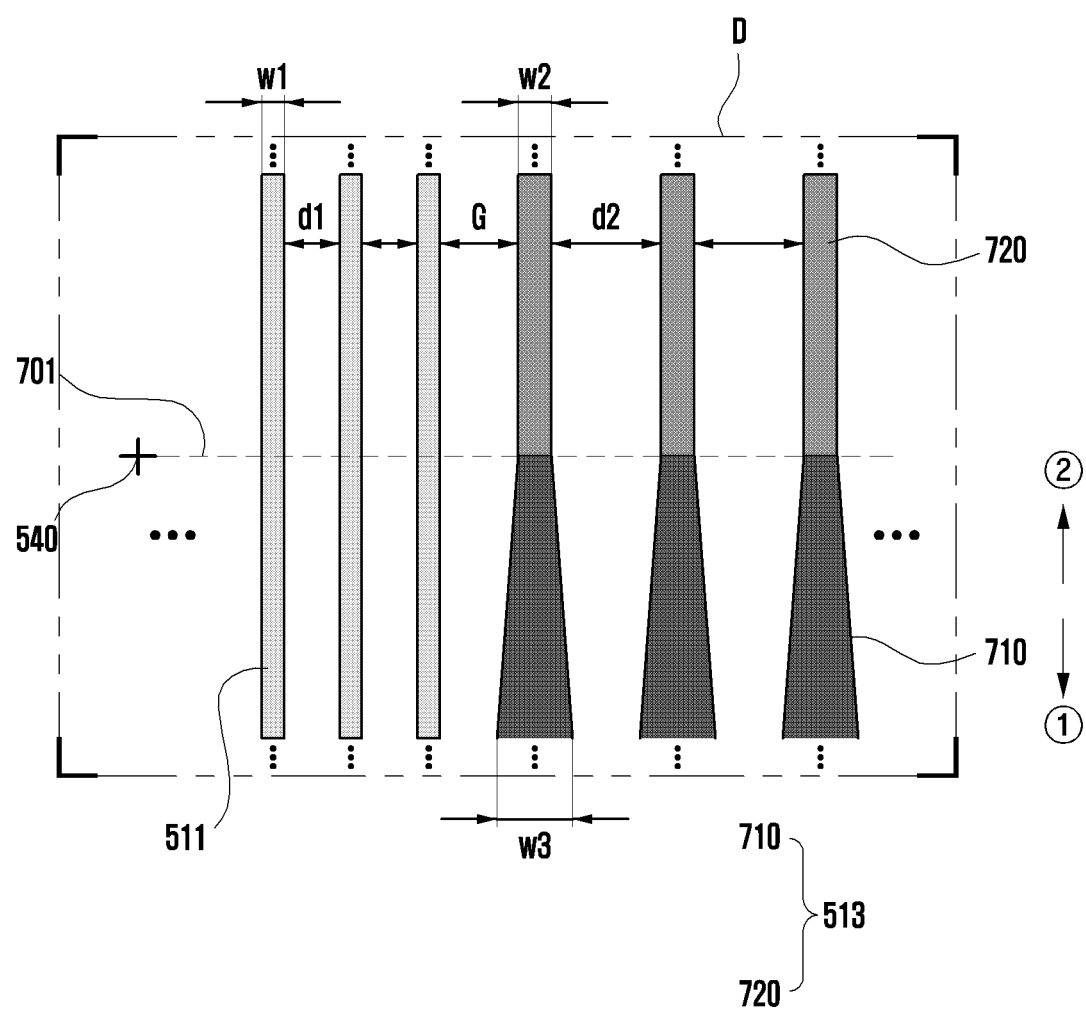
FIG. 9 is a view illustrating a first coil according to an embodiment of the disclosure.

FIG. 9 is a view illustrating a first coil according to an embodiment of the disclosure.

Referring to FIG. 9, the line width of the first parts 710 disposed in the first direction (①) of the transverse axis 701 may vary. For example, the third line width w3 that is the line width of the first parts 710, as illustrated in FIG. 9, may gradually increase as it goes toward the first direction (①). According to some embodiments, the third line width w3 may gradually increase as it goes toward the first direction (①), and then may be maintained at a fixed specific value. For example, the third line width w3 may be disposed to have a value of T1 mm (T1 is a rational number) at a border portion of the transverse axis 701, and may increase in a range of T1 mm to "T1+T2" mm (T2 is a rational number) as it goes from the border portion of the transverse axis 701 toward the first direction (①). The third line width w3 may be maintained at a fixed value while not increasing further after it reaches the line width of "T1+T2" mm.

Referring to FIGS. 2 and 8, the first direction (①) may be a direction that is parallel to the lengthwise direction that defines the length of the electronic device 200.

According to an embodiment, the housing (e.g., the housing 205 of FIG. 2) may be disposed lengthwise in a direction that is parallel to the first direction (①). In the FPCB (e.g., the FPCB 201 of FIG. 2), the first coil 510 may be disposed at an upper portion (e.g., a peripheral portion of the camera 203) from the central portion of the electronic device 200. For example, the upper portion may be a portion that is located in the second direction (②) that is opposite to the first direction (①) from the central portion of the electronic device 200.

According to an embodiment, the housing 205 may include a first side surface 215 that is adjacent to the upper portion (e.g., a peripheral portion of the camera 203) and a second side surface 217 that is opposite to the first side surface 215, and the first coil 510 may be arranged to be closer to the first side surface 215. For example, a first distance ("a" of FIG. 2) between the center 540 of the first coil 510 and the first side surface 215 may be smaller than a second distance ("b" of FIG. 2) between the center 540 of the first coil 510 and the second side surface 217.

According to another embodiment, the first coil 510 may be arranged to be closer to the second side surface 217, and in this case, the first parts 710 having the third line width w3 may be disposed in the second direction (②) from the center of the first coil 510. If the first parts 710 having the third line width w3 are disposed in the second direction (②) from the center 540 of the first coil 510, the recognition range for wireless charging may be widened in the second direction (②) from the center 540 of the first coil 510.

Figure 10:
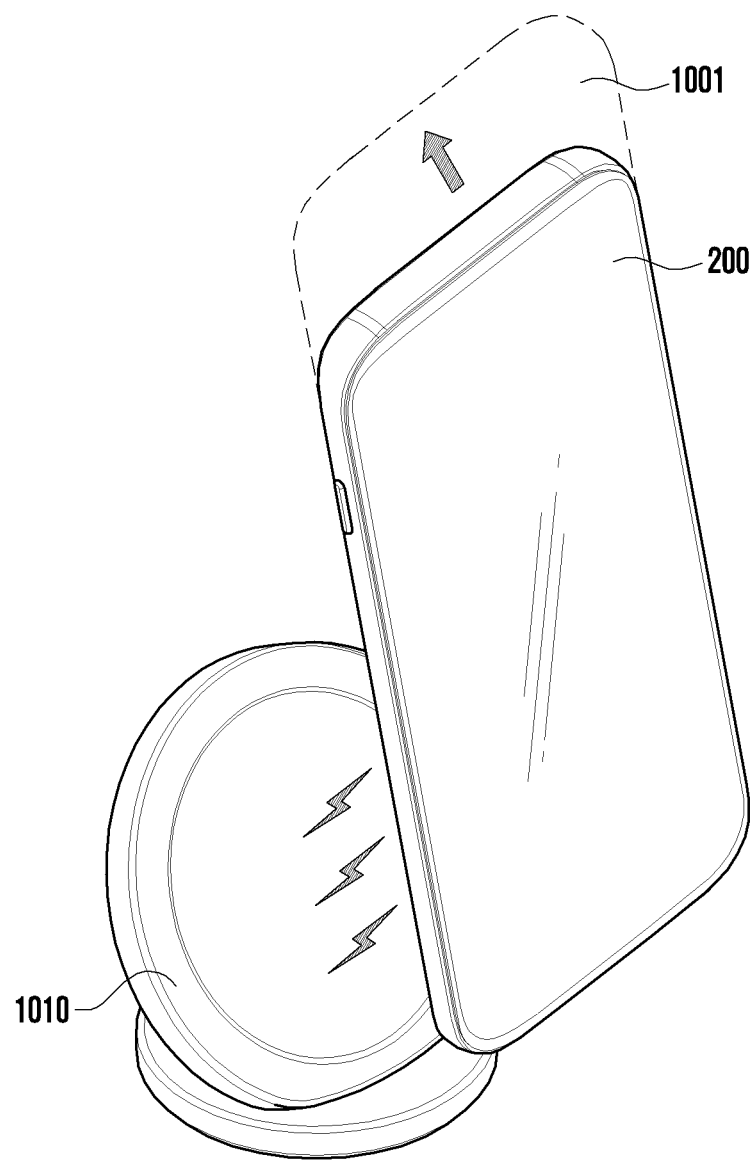
FIG. 10 is a view illustrating a state, in which an electronic device is held on a stand type wireless charging device according to an embodiment of the disclosure.

FIG. 10 is a view illustrating a state, in which an electronic device is held on a stand type wireless charging device (e.g., a charging pad or a charging cradle) according to an embodiment of the disclosure.

Referring to FIG. 10, the electronic device 200 (e.g., the electronic device 200 of FIG. 2) according to various embodiments can widen a recognition range for wireless charging by changing a structure of a first coil (e.g., the first coil 510 of FIG. 5A) for wireless charging. The electronic device 200 according to various embodiments can widen a recognition range for wireless charging due to the structural change of the first coil 510 to increase the compatibility with a wireless charging device 1010 (e.g., a charging pad or a charging cradle), thereby increasing charging efficiency, even though the length of the electronic device 200 increases as indicated by a reference numeral "1001".

Figure 11:
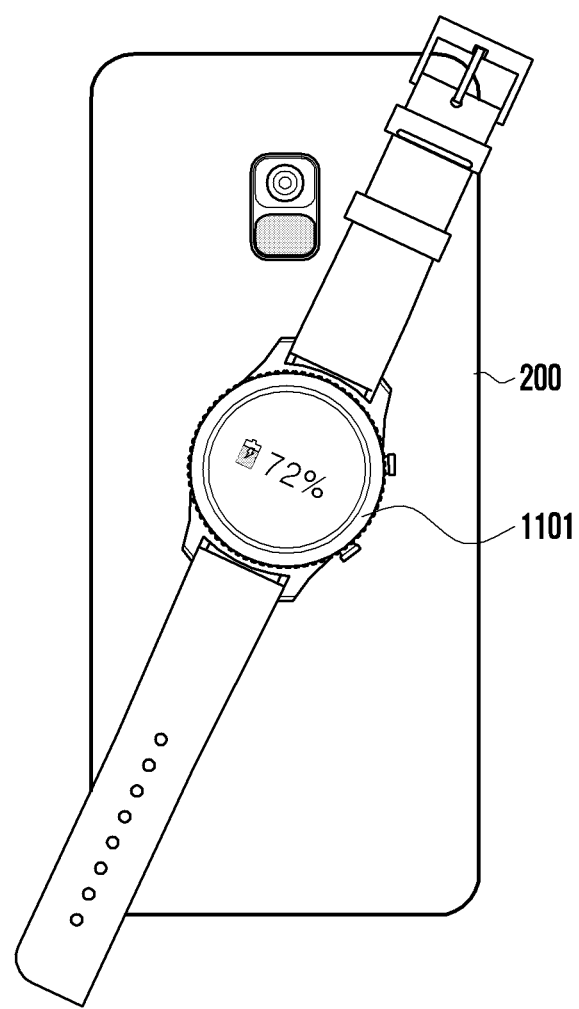
FIG. 11 is a view illustrating a state, in which a transmit (Tx) function of transmitting wireless power by an electronic device is performed according to an embodiment of the disclosure.

FIG. 11 is a view illustrating a state, in which a Tx function of transmitting wireless power by an electronic device is performed according to an embodiment of the disclosure.

Referring to FIG. 11, a wireless charging system according to an embodiment may include an electronic device 200 (e.g., the electronic device 101 of FIG. 1) as a wireless power transmitting device and an external device 1101 (e.g., the electronic device 102 of FIG. 1) as a wireless power receiving device.

The electronic device 200 (e.g., the wireless power transmitting device) according to an embodiment is an electronic device 200 including a wireless power sharing function (or a wireless power transmitting function), and for example, may be a smartphone.

The external device 1101 (e.g., the wireless power receiving device) according to an embodiment is an electronic device 1101 including a wireless battery charging function (or a wireless power receiving function), and for example, may be a wearable device. According to another embodiment, the external device 1101 may be an electronic device that is the same as or similar to the electronic device 200.

The electronic device 200 according to an embodiment may transmit electric power to the external device 1101 by using the above-described first coil (e.g., the first coil 510 of FIG. 5A).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a battery;
   a charging circuit; and
   a coil electrically connected to the charging circuit, wherein the coil comprises:
      a plurality of inner patterns arranged adjacent to a center of the coil, having a first line width, and wound spirally, and
      a plurality of outer patterns arranged on an outer side of the plurality of inner patterns and wound spirally,
   wherein the plurality of inner patterns are arranged at a first interval,
   wherein the plurality of outer patterns are arranged at a second interval,
   wherein a maximum gap that is larger than the first interval and the second interval is disposed between the plurality of inner patterns and the plurality of outer patterns,
   wherein the maximum gap is arranged in a first direction from the center of the coil,
   wherein a curvature of the plurality of inner patterns is different than a curvature of the plurality of outer patterns, and
   wherein the plurality of outer patterns include first parts having a third line widths, and second parts having a second line width different from the third line width, the first parts comprising one half of the plurality of outer patterns, and the second parts comprising the other half of the plurality of outer patterns.

2. The electronic device of claim 1, wherein the plurality of outer patterns are wound to have an elliptical shape, which is long in a direction that is parallel to the first direction.

3. The electronic device of claim 1, wherein the second line width is larger than the first line width.

4. The electronic device of claim 1, wherein the second interval is larger than the first interval.

5. The electronic device of claim 1, wherein a distance between, among the plurality of outer patterns, an innermost outer pattern, which is closest to the center of the coil, and the center of the coil has a maximum value at a portion, at which the maximum gap is disposed.

6. The electronic device of claim 1, further comprising:
   a housing disposed to be long in a direction that is parallel to the first direction and comprising a first side surface and a second side surface that is opposite to the first side surface,
   wherein a first distance between the center of the coil and the first side surface is smaller than a second distance between the center of the coil and the second side surface.

7. The electronic device of claim 6, wherein the second side surface is arranged in the first direction from the center of the coil.

8. The electronic device of claim 1,
   wherein the plurality of inner patterns are wound to have a circular shape when the center of the coil is viewed from a top, and
   wherein the plurality of outer patterns are wound to have an elliptical shape when the center of the coil is viewed from the top.

9. An electronic device comprising:
a battery;
a charging circuit; and
a coil electrically connected to the charging circuit, wherein the coil comprises:
 a plurality of inner patterns arranged close to the center of the coil, having a first line width, and wound spirally, and
 a plurality of outer patterns arranged on an outer side of the plurality of inner patterns and wound spirally,
wherein the plurality of inner patterns are arranged at a first interval,
wherein the plurality of outer patterns are arranged at a second interval,
wherein the plurality of outer patterns include first parts having a third line width, and second parts having a second line width different from the third line width, the first parts comprising one half of the plurality of outer patterns, and the second parts comprising the other half of the plurality of outer patterns,
wherein the second line width is larger than the first line width,
wherein the third line width is larger than the second line width, and
wherein a curvature of the plurality of inner patterns is different than a curvature of the plurality of outer patterns.

10. The electronic device of claim 9,
wherein the first parts are disposed in a first direction of a transverse axis that crosses the center of the coil, and
wherein the second parts are disposed in a second direction of the transverse axis.

11. The electronic device of claim 10, wherein the second direction is opposite to the first direction.

12. The electronic device of claim 10, wherein the plurality of outer patterns are wound to have an elliptical shape, which is long in a direction that is parallel to the first direction.

13. The electronic device of claim 10, further comprising:
a housing disposed to be long in a direction that is parallel to the first direction and comprising a first side surface and a second side surface that is opposite to the first side surface,
wherein a first distance between the center of the coil and the first side surface is smaller than a second distance between the center of the coil and the second side surface.

14. The electronic device of claim 13, wherein the second side surface is arranged in the first direction from the center of the coil.

15. The electronic device of claim 9,
wherein the plurality of inner patterns are wound to have a circular shape when the center of the coil is viewed from a top, and
wherein the plurality of outer patterns are wound to have an elliptical shape when the center of the coil is viewed from the top.

16. A circuit board comprising a coil for performing wireless charging, wherein the coil comprises:
a plurality of inner patterns arranged close to a center of the coil, having a first line width, and wound spirally; and
a plurality of outer patterns arranged on an outer side of the plurality of inner patterns and wound spirally,
wherein the plurality of inner patterns are arranged at a first interval,
wherein the plurality of outer patterns are arranged at a second interval,
wherein a maximum gap that is larger than the first interval and the second interval is disposed between the plurality of inner patterns and the plurality of outer patterns,
wherein the maximum gap is arranged in a first direction from the center of the coil,
wherein a curvature of the plurality of inner patterns is different than a curvature of the plurality of outer patterns, and
wherein the plurality of outer patterns include first parts having a third line width, and second parts having a second line width different from the third line width, the first parts comprising one half of the plurality of outer patterns, and the second parts comprising the other half of the plurality of outer patterns.

17. The circuit board of claim 16, wherein the plurality of outer patterns are wound to have an elliptical shape, which is long in a direction that is parallel to the first direction.

18. The circuit board of claim 16, wherein the second line width is larger than the first line width.

19. The circuit board of claim 16, wherein the second interval is larger than the first interval.

20. The circuit board of claim 16, further comprising:
another coil arranged outside the coil for performing magnetic secure transmission.

21. The circuit board of claim 16,
wherein the plurality of inner patterns are wound to have a circular shape when the center of the coil is viewed from a top, and
wherein the plurality of outer patterns are wound to have an elliptical shape when the center of the coil is viewed from the top.

* * * * *